United States Patent [19]

Davis et al.

[11] Patent Number: 5,576,755
[45] Date of Patent: Nov. 19, 1996

[54] SYSTEM AND METHOD FOR VERIFICATION OF ELECTRONIC TELEVISION PROGRAM GUIDE DATA

[76] Inventors: Bruce Davis, 5505 Preserve Pkwy. South, Greenwood Village, Colo. 80121; Paul Darata, 2599 W. Long Cir., Littleton, Colo. 80120; Michael Morris, 30 Whistling Swan La., Downington, Pa. 19355; Michele S. Schwartz, 2900 Knights Rd. A-16, Bensalem, Pa. 19020; Debbie Collins, 1 Ashbourne Rd., Darby, Pa. 19023; John H. Dasch, 761 Collins Ave., Lansdale, Pa. 19446; Jonathan S. Zucker, 1559 Fitzwatertown Rd., Willow Grove, Pa. 19090; Mitchell S. Gorman, 2807 Sagemore Dr., Marlton, N.J. 08053

[21] Appl. No.: 330,684

[22] Filed: Oct. 28, 1994

[51] Int. Cl.[6] .................................................. H04N 7/14
[52] U.S. Cl. ............................ 348/13; 348/906; 348/12
[58] Field of Search .............................. 348/6, 7, 12, 13, 348/906, 9, 722, 180; 455/4.2, 5.1, 6.1, 3.1; H04N 16, 173

[56] References Cited

U.S. PATENT DOCUMENTS

| | | | |
|---|---|---|---|
| 4,639,779 | 1/1987 | Greenberg | 348/906 |
| 4,706,121 | 11/1987 | Young | 348/906 |
| 4,945,412 | 7/1990 | Kramer | 348/460 |
| 5,283,639 | 2/1994 | Esch et al. | 348/906 |
| 5,323,234 | 6/1994 | Kawasaki | 348/6 |
| 5,353,121 | 10/1994 | Young | 348/563 |
| 5,416,508 | 5/1995 | Sakuma et al. | 348/906 |

OTHER PUBLICATIONS

Brugliera, Vito, "Digital On–Screen Display—A New Technology for the Consumer Interface", Symposium Record Cable Sessions, Montreux, Jun. 10–15, 1993, pp. 571–586.
Gordon, Ronald D., "An Intelligent Electronic Book System and Publishing Facility", Globecom '82–IEEE Global Telecommunications Conference, vol. 3/3, Miami (US), Nov.
Cohen, P. S. and Herbst, N. W., "Video Disc Dictionary System", IBM Technical Disclosure Bulletin, vol. 25 No. 8, Jan. 1983.

*Primary Examiner*—Victor R. Kostak
*Attorney, Agent, or Firm*—Weil, Gotshal & Manges LLP

[57] ABSTRACT

The system and method of the present invention provides for automated checking of the program listings data in a database of television program schedule listings used in an electronic program guide ("EPG"). The integrity of the program listings data is verified prior to transmission of the data to a cable or other pay television system (or prior to transmission to viewers). The verification system may be used to check the entire database or a user-defined subset of the database for one or more of the following: missing stations, schedule gaps and overlaps, missing titles, missing copy, missing fields, missing movie ratings, lengthy titles, lengthy copy, editorial errors, and inappropriate language. In this manner, the EPG provider ensures the integrity of the EPG data and substantially reduces the time required to manually check all of the data in the program listings database. The verification system may be easily integrated with other processing steps performed on the EPG data prior to being transmitted to cable and multi-system operators.

50 Claims, 6 Drawing Sheets

Microsoft Access

<u>E</u>dit <u>V</u>iew <u>R</u>ecords <u>W</u>indow <u>H</u>elp

Correction Editor

Currently Correcting: _____ PIN: _____ Live: ☐

- TVG Title:
- Date/Time:
- Program Type:
- Run Time:
- Category:
- MPAA Rating:
- Short Copy:
- Long Copy:
- Promo Copy:

- Station:
- Station Type:
- Slot Time:
- Program Origin:
- Price:

[Skip]

[Help]  [Cancel]  [Save]  [Exit]

Form View | NUM

FIG. 6

SYSTEM AND METHOD FOR VERIFICATION OF ELECTRONIC TELEVISION PROGRAM GUIDE DATA

BACKGROUND OF THE INVENTION

This invention relates to an electronic program guide ("EPG") system that provides users with schedule information for broadcast or cablecast programs available for viewing on a video display. More particularly, it relates to a system and method for verification of the EPG data prior to transmission to a plurality of remote locations such as cable system head ends or viewer sites.

Electronic program guides for television systems are known in the art, particularly with regard to cable television systems. For example, one common implementation of a electronic program guide utilizes a dedicated cable television channel for continuously broadcasting program schedule information. The advantage of such a system is that it is relatively easy to deploy because it is centrally implemented at the cable head-end. No additional electronics or software are required at the viewer location because full control of the display is maintained at the cable head-end. The display information is then broadcast continuously on a dedicated cable channel. The television viewer simply tunes the cable converter box or television tuner to the channel on which the schedule information is modulated and views the program listings. Typically, these program guides utilize a scrolling display of television listings or a fixed display that periodically changes. Some systems employ a partial screen of listings with additional information in the remainder of the screen such as advertisements for movies on pay channels, pay-per-view (PPV) event schedules, time and weather information, and other commercial information. These systems generally incorporate a grid or matrix to display the program schedule information, with a different row for each channel and columns representing different time slots.

In addition, interactive program guides are also known. Such guides permit the user to select the program listings to be displayed based on user selection criteria and display the listings on the television receiver in a desired format. Interactive guides are more versatile than dedicated channel guides because they operate under user control. However, they are more costly to implement because they require memory and processor capabilities at each user site. The present invention may be used with either dedicated channel or interactive program guides because it operates on the program listings data common to both types of guides.

Modern cable systems include upwards of 100 channels. Thus, for both dedicated channel and interactive program EPGs, large quantities of data are required to provide a complete listing of program schedule information. A problem common to both types of systems is that there are often errors in the data that must be corrected. Errors may arise for any number of reasons. First, it is common for a complete database of program listings to be compiled from several different sources. Much of the data is available on a national basis, including network schedules (both broadcast and cable), pay-per-view listings, and regional programming. Some data, however, must be obtained at a local level, including locally originated programs, channel maps for individual cable systems, and pricing for pay-per-view programs. The fact that there is no single entity responsible for compilation of the entire listings database increases the risk of errors. For example, a portion of the data may need to be converted to a different format before it can be utilized in the program guide.

Second, the listings database contains an enormous amount of data. Electronic program guides, whether of the dedicated channel or interactive variety, include a database comprising the program listings information for the various stations and pay-per-view channels. The listings data may be arranged in weekly blocks or other time periods. As an example, consider a cable system with eighty (80) channels, each one broadcasting 24 hours a day. Assuming for each station a daily average of four hours of two-hour programs, five hours of on-hour programs, and the balance comprising one-half hour programs, 37 different programs are aired per channel per day. Thus, a one week database comprises on average information for 37×80×7=20,720 programs. Although many programs repeat on a daily basis, it is apparent that even one weeks' worth of program listings for the average cable system is a very large amount of data. In addition, while much of the data may be compiled in advance, a substantial number of listings must be added, and schedule changes accounted for, shortly before the data is transmitted to the various cable systems. The volume of data makes it difficult and time consuming to manually ensure its reliability.

Finally, certain programs, primarily sports events, are not scheduled as far in advance as other programs. For example, although a time slot may be slated for a baseball game, it may not be known until one week or less in advance of the scheduled game, the particular game to be broadcast. There is thus a need to efficiently and quickly identify entries in a listings database that require editing of one form or another either to add information or correct errors.

A program listings database with incorrect listings or incomplete information is of limited utility. There is thus a need to ensure the reliability of the data transmitted to the cable systems and ultimately to viewers. However, because the volume of data is so great, there is a need for an automated procedure for verification of the data to reduce the number of manual hours required. There is thus a need for an automated system and method of reviewing the EPG data and flagging any errors therein. In addition, there is a need to provide a list of any such errors to a database editor to permit the editor to take whatever corrective action is necessary. In addition, different data may need to be generated for different cable systems because, e.g., each cable system may have different local programming or pay-per-view programs or schedules.

One factor that complicates the task is the need for a program listings database to be compatible with a plurality of different platforms. Different cable systems may have different hardware configurations at the cable system head-end and different set-top converter boxes at the viewer locations. For example, EPGs typically display program listings in grid format with columns representing different time slots and rows representing different channels. Set-top converters vary with regard to their text display capabilities. Some may display text using a proportional font while others use a standard font. In addition, some are configured to display symbols in the grid cells in addition to text which decreases the available space for text display. Thus, the database must be configured in such a way to accommodate the varying capabilities of set-top converters. One way to accomplish this is by editing the text (program titles, copy, station identifications, and any other text included in the EPG) to abbreviate any text that does not fit into a particular grid cell. A system for assisting in this "text fit" process is described in co-pending application Ser. No. 08/247,059.

Thus, when verifying the data prior to transmission to a cable system, it is necessary to specify the platform on which the EPG operates so as to determine if the listings are properly edited for the particular platform.

The system and method of the present invention provides for automated checking of the program listings data in the database. The disclosed invention solves these and other problems of prior art EPG systems by providing a system and method for verification of the EPG data prior to transmission to a cable or other pay television system (or prior to transmission to viewers). Prior to being processed by the data verification system of the present invention, the database of television program schedule listings may undergo initial processing as follows. First, the data is collected from the various information providers and checked for high level errors. Next, it may be required to normalize the data to the EPG database structure and format as it is possible that the information collected from the different sources uses different formats and syntax. Finally, the data may be processed with a text fit system to determine if any titles in the database require editing in order to fit within a grid cell of a predetermined size for any of the different platforms on which the EPG will operate. Alternatively, the text fit process may be incorporated as part of the listing verification process so that text requiring editing to fit within a particular grid cell size is identified and presented to the user for editing if not already included in a library or look-up table of pre-edited text.

At this stage, the listing verification system and procedure of the present invention operates on the data to check for any errors in the data. In particular, checks may be run for any missing stations, schedule gaps, schedule overlaps, missing titles, missing copy, missing fields (i.e., run time, slot time, program type), missing movie ratings, missing program origin, missing PPV price, PPV events on non-PPV station, non-PPV event on PPV station, inappropriate language, lengthy titles, lengthy copy, and editorial errors. "Lengthy" as used herein refers to text that is too long to fit into the allocated grid space in the program guide. Errors are automatically written to output files and separate files are used for each of the above parameters.

The database may also be processed by additional steps such as a program listings editing system to cream, delete, or modify individual program listings and a channel map editing system to create, delete, or modify individual channel maps, which contain information identifying the stations carried by a cable system as well as the on-air times for each station. The program listings may be searched using the program title, program identification number (PIN), or station name. It is preferable to perform these editing steps prior to listing verification and text fit to ensure that all of the data in the data file has been processed by these latter two steps. Alternatively, the listing verification process may be re-run if any editing is performed after initial verification of the data. Finally, an extract process is run against the database to create data files containing cable system specific data based on a specified date range and channel map. The data files may be ASCII or tightly packed binary files readable by the cable system to which it is destined. Finally, the data is processed according to the specific platform and transmitted to the designated cable system. Cable system as used herein is not limited to standard cable television systems but includes direct broadcast television systems, over-the-air pay television systems, and any other television program distribution system including central control over the distribution of a television signals for a plurality of stations.

BRIEF DESCRIPTION OF THE DRAWINGS

FIG. 6 is illustration of the correction editor feature of one embodiment of the data verification system of the invention herein.

DETAILED DESCRIPTION OF THE PREFERRED EMBODIMENT

System Configuration

Figure 1:
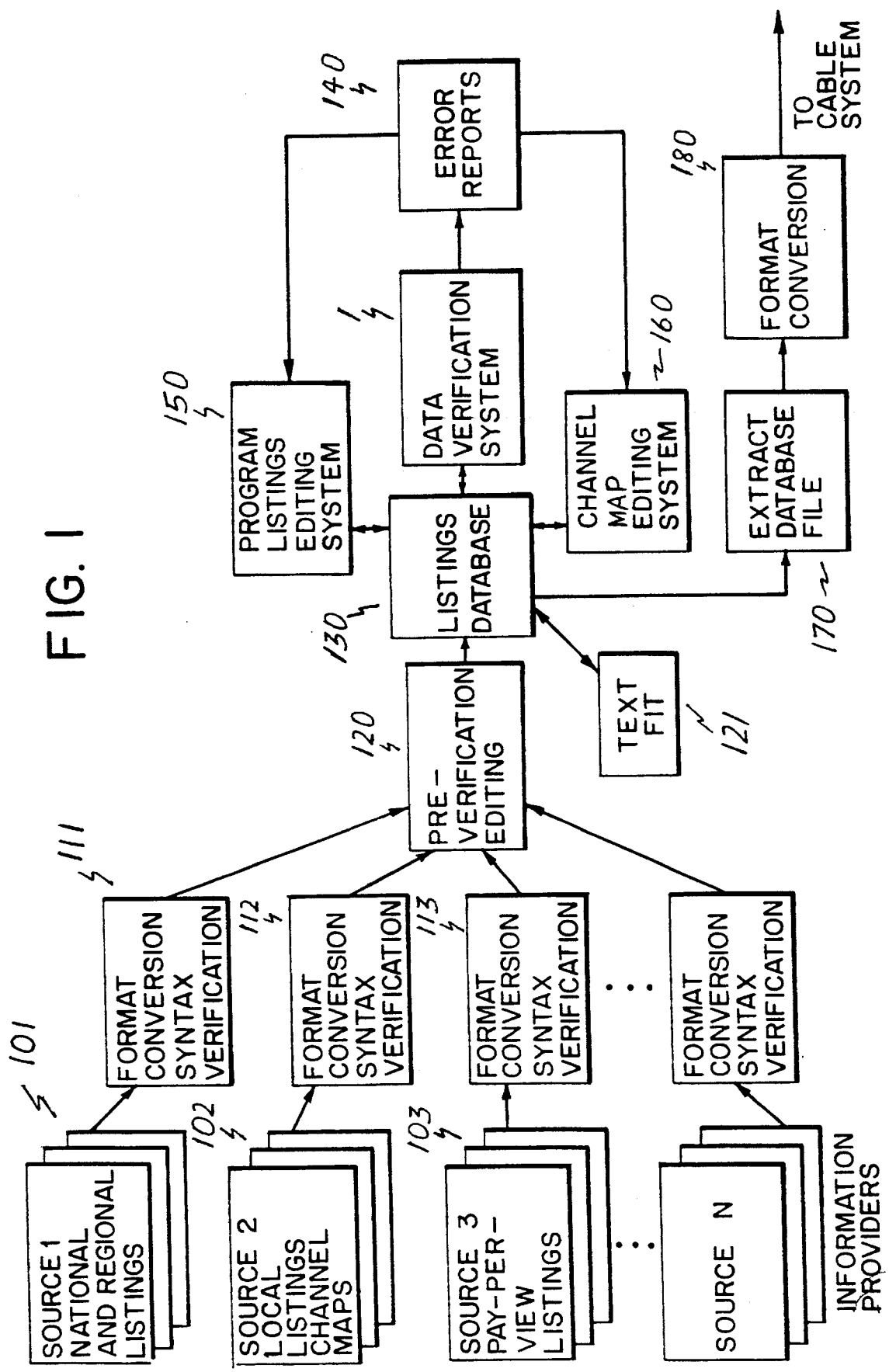
FIG. 1 is a block diagram showing an EPG delivery system including the data verification system of the invention herein.

The data verification system 1 of the present invention may be described with reference to the appended figures. FIG. 1 is a block diagram illustrating schematically the general configuration for one embodiment of an electronic program guide delivery system. Information for the database may originate from several different information providers. For example, one source 101 may provide all the national listings which may include network (both broadcast and cable) schedules, and regional program schedules or, alternatively, there may be multiple sources of such information. A single second source 102 (or combination of second sources) may provide local listings information which includes schedules for locally originated programs, channel maps for individual cable systems, and information on shared channels (single cable channels that carry different programming during different parts of the day). A third information provider 103 (or multiple providers) may furnish all of the listings information for pay-per-view events. It may even be the case that each of these categories of program schedule information are provided by multiple sources. Of course, it is also possible that all the information be gathered and provided by a single source or that overlapping information be gathered from the multiple sources. In addition, there may be other information providers such as billing vendors that furnish billing information.

Due to the fact that the listings database is likely to be comprised of information from a variety of different sources which may or may not furnish the data in the desired format, it may be necessary to perform format conversion and/or syntax verification 111–113 on the received data prior to loading it into the database. This step is necessary to ensure that the data is in a uniform format in the database for further processing. A second function which may be performed on the data is pre-verification editing 120. One example of such editing is processing of the data by the text fit system 121 disclosed in co-pending application Ser. No. 247,059. Text fit processing in effect expands the database to include multiple values for text fields for individual listings to accommodate different EPG platforms. For example, varying amounts of space are allocated for program titles for the different platforms. In addition, within the same platform, multiple versions of a title may be required to fit inside grid cells of, e.g., for a two hour program, 30, 60, 90, and 120 minutes. The text fit system determines whether an edited version of a title is required to fit within the designated space for a particular platform and grid cell. The database is then edited to include an abbreviated version of the title as well as the full title for the listing. It is also possible that a portion of the data will already contain multiple versions of titles. In some cases, it may be desirable to incorporate the text fit process into the verification utility by using the verification utility to first identify listings requiring processing with the text fit system and then running the text fit system on these identified listings. Depending on the particular implementation of the EPG delivery system, it may be desirable or necessary to perform additional pre-verification processing on the data.

Following the pre-verification processing steps, the listings database 130 is assembled and processed by the data verification system 1. As shown in FIG. 1, the data verification system 1 operates on the listings database and generates error reports 140 for errors found therein. The program listings and channel map editing systems 150 and 160 are used to make changes to the data in the listings database 130. The data verification system operates under user control to determine which data fields are to be checked. Alternatively, the system can operate fully automatically to check all data fields. An advantageous feature of one embodiment of the present invention is the creation of reports for each type of error. The reports permit the editor to reconcile any missing or conflicting information in the database with the information provider. The reports may be electronically generated and then viewed on a computer, stored in electronic format, or printed as hard copies. The utility operates on the database of program listings information for a user definable time period, such as one week. For each verification utility, stations may be selected individually, by channel map, platform type, multi-system operator ("MSO"), or arbitrary grouping. Each of the processing options associated with the system is discussed below. The operation of the various options is discussed under the section headed "System Operation." Following processing by the data verification system 1, the data is transmitted to cable systems after undergoing extraction 170 and format conversion 180.

1. Missing Stations

In order to determine if there are any stations missing from the database, the listings database (or any subset thereof) is checked against a second database that includes a list of all stations that should be included in the listings database or subset, such as a station list file for a particular cable system. The missing stations verification utility then outputs to a file a list of the missing stations.

2. Schedule Gaps and Overlaps

It is important to ensure that there are no gaps in the programming schedule. Included in the database is an indication of the daily on-the-air periods for each station. The database is then checked to determine if, for any designated station, there are any gaps between the ending time of a program and the start time of the next program. The end times for listings are calculated by adding the program's slot time (total time until the beginning of the next listing) to the start time. The system provides the flexibility of being able to specify any time range for checking for gaps and overlaps. If the beginning of the time range for a channel does not coincide with the beginning of a program, the system will check for the "intersecting listing", i.e., the listing starting prior to and ending after the beginning of the specified time range. Schedule holes are written to a file that includes the date, station, start time, and end time of the hole or other information sufficient to uniquely identify the schedule hole.

This option also checks for overlaps in a similar manner. If the listings data indicates that a program on a particular channel begins prior to the sum of the start time plus the run time of the previous program, the listing is flagged as a program overlap error.

3. Missing Titles

The listings database is checked for missing titles for program events, i.e., where the listing has no title field. Listings with missing titles are written to a file that includes the date, station, and start time of the listing.

4. Missing Copy

Certain program listings include additional descriptive information in addition to the program title called "copy." These include movies, live sports, and pay-per-view programs. The additional information may also be provided for other programs as well as determined by the operating rules for the EPG. The missing copy option checks these listings for missing copy and writes any such listings to a file with sufficient context data to identify the program, such as program date, station, start time, and title.

5. Missing Fields

This option checks the database listings to ensure that all required fields for each type of program are present. For example, according to the operating rules of the EPG as defined by the EPG provider, the schedule information for pay-per-view and premium movies must include an MPAA rating as this parameter may be used by viewers to lock-out certain movies. Thus, the missing fields option will check that the MPAA rating, as well as the other fields dictated by the operating rules, are in the database for the pay-per-view and premium listings. For PPV events, the operating rules may further dictate that the schedule information include price information, a telephone number for ordering the event, and promotional copy used for advertising the event. The missing fields option would then check these fields as well for programs designated as PPV events. Similarly, the operating rules may dictate different required fields for other types of listings. Listings with missing fields are written to a file including the date, station, and start time of the program, as well as an identification of the missing field.

6. Missing Movie Ratings

The listings database includes the MPAA movie ratings for movies to be shown on premium and PPV channels. Any such movies with missing ratings are written to a file including the date, station, start time, and title of the movie.

7. Lengthy Titles

Some or all of the data in the database may have already been processed with the text fit system to provide multiple titles where required to fit into the grid cells. The lengthy titles option permits the user to perform an additional check for any titles that do not fit into the maximum allowable space for each of the selected platforms and also identifies those entries not yet processed with the text fit system. Any such titles found are written to a file including the platform, date, station, start time, and title of the listings. This option may be selected for any of the platforms on which the EPG operates. The titles may then be processed using text fit and the verification utility re-run on the database.

8. Lengthy Copy

This option is similar to the lengthy title option and searches the listings database for the copy of movies, live sports, pay-per-view programs, and any other entries with copy that will not fit into the allowable space for the selected platforms. Any such listings found are written to a file including the platform, date, station, start time, and title of the listings.

9. Editorial Errors

The listings database is searched for editorial errors which can include, inter alia, duplicated titles or years in the copy of a movie, cross references to other days, and certain phrases such as "at press time." Editorial errors are written to a file including the date, station, start time, and description of the error found for each listing. Of course, these particular errors represent only one particular embodiment of the system designed to detect the most common types of errors—the utility may readily be modified to detect any specified editorial errors.

10. Language

This option searches the listings database for inappropriate language in titles, copy, and messages. The listings database is checked against a language dictionary that includes all of the language deemed inappropriate. Listings with any such language are written to a file including the date, station, start time, and inappropriate language found.

11. Other Verification Options

The above options for verifying the data in the listings database are not exhaustive. The verification system may be readily configured to check any field in the database. Some of the other fields which may be checked are as follows: missing program type, missing slot time, missing run time, missing program origin, PPV event on a non-PPV station, non-PPV event on a PPV station, and missing price or promotional copy for PPV events. Program type refers to the type of broadcast, i.e., broadcast, PPV, near video on demand ("NVOD"), etc. The slot time of a program is the total time from the beginning of one program until the start of the next program, including commercial time, and program run time is the actual running time of the program itself. The slot time for a program must exceed (or be only slightly less than) its run time, which is another possible verification option. Program origin indicates the source of the program. The program type and station type are used to check whether a PPV event is scheduled on a non-PPV station and whether a non-PPV event is scheduled on a PPV station.

It will be recognized by those of skill in the art that the particular information written to the appropriate file when an error or omission is located is not critical. All that is necessary is that sufficient context data is supplied to uniquely identify the faulty listing for correction purposes.

The data verification system may also be configured with an error navigation feature as follows. Following processing of the database or designated subset thereof and generation of the various error reports, the system may be configured to return to the portions of the database identified as containing errors, retrieve the appropriate database entries, and present them to the user for correction. Following correction of the errors, the database may again be processed with the data verification utility to check for errors. In this manner, an iterative process may be implemented to correct and verify all of the data in the database.

System Operation

Figure 2:
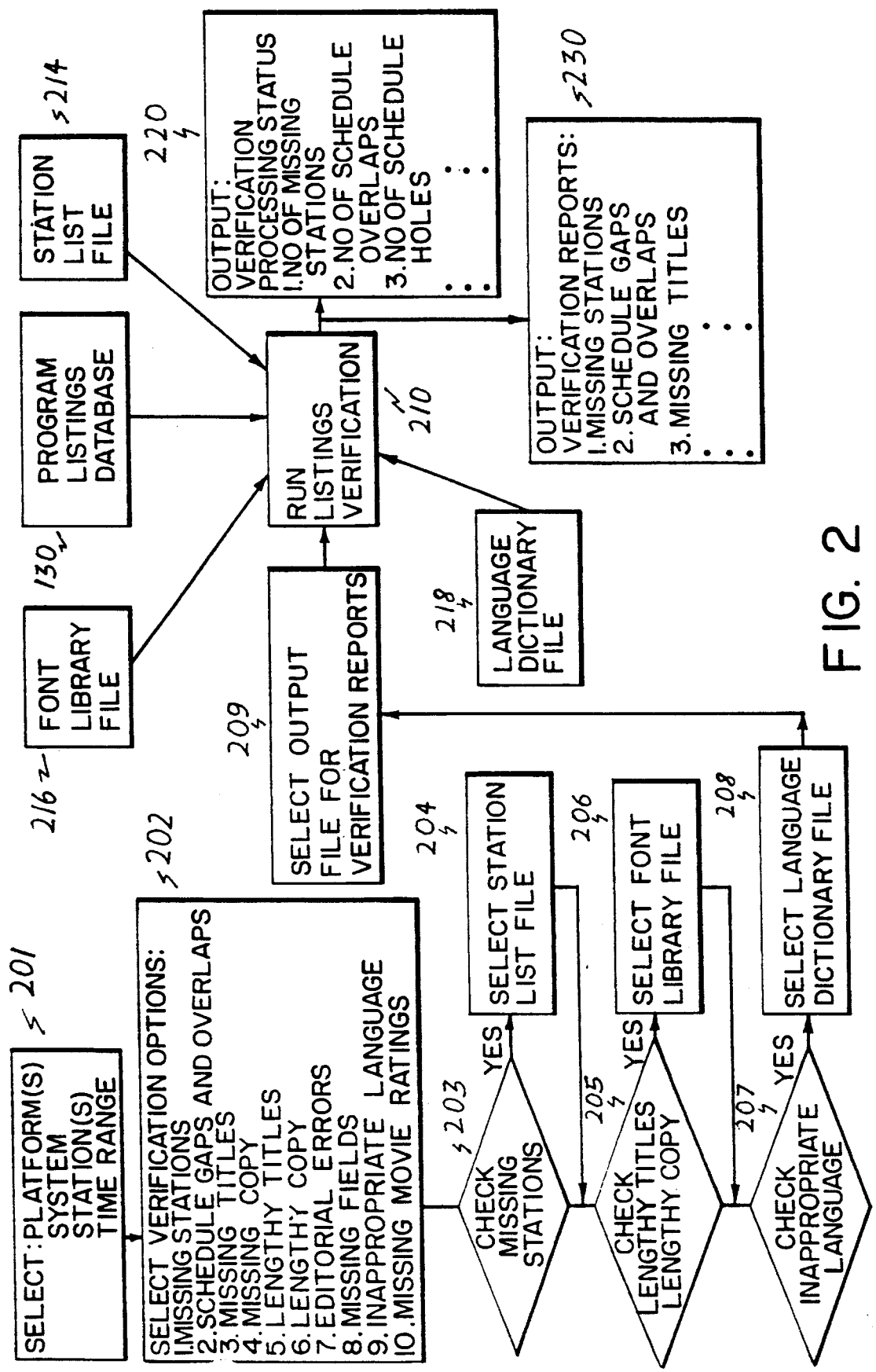
FIG. 2 is a flow chart illustrating the overall operation of the data verification system of the invention herein.

The data verification utility operates as shown in the flow diagram of FIG. 2. First the user is queried at 201 to specify the platform or platforms and the channel maps for which the utility is to be run. Alternatively, with a database such as that described in Tables 1 and 2, the user need only specify the cable group, system, or head end. The verification system can then extract from the database the appropriate platform(s) and channel map(s). Next, the desired verification options are chosen at 202. Alternatively, the user may elect to activate all verification options. Depending on the options selected, the user may be queried for additional information. If the "Check Lengthy Titles" or "Check Lengthy Copy" option at 205 is selected, the user must input the path and filename for a font library file at 206 in order to determine the proper font to be used for display of the text. If the selection of a platform uniquely determines the font, this step may be eliminated as the file may be selected automatically. The particular font chosen affects the space required to display the text. Of course, the user may be supplied with a list of possible files and need only select a file from the displayed list. If the "Check Missing Stations" option 203 is selected, the user will be requested to enter a master list of all stations that should appear in the listings database or a subset of stations representing the list for a particular cable system at 204. This information may be contained in a station list file. If the "Check Language" option 207 is selected, the user enters a language dictionary file at 208 containing a library of inappropriate words. Finally, the user is queried to enter a path and filenames for the output verification reports at 209. Of course, a default path and filename may be used. Separate verification reports are generated for each selected option. The user may also elect to combine chosen reports into a single report.

Alternatively, to minimize the amount of user interaction required, the database may be configured to define all the necessary parameters so that the user need only select the cable system and verification options. For each cable system (or cable group or head end), the database contains a table with the correct platform(s) and a table listing the different fonts available for use with the platforms so that the user need not designate the font library file. Similarly, the language dictionary file may be defined by the choice of platform, eliminating the need for the user to define the file.

Following input of all the requested information, the data verification utility displays the selected options and user entered parameters for confirmation by the user. The data verification process 210 then begins. The user-selected station list file 214, font library file 216, and language dictionary file 218, as well as the listings database 130, are all shown as inputs to the verification process. Following processing, the system displays to the user a summary report showing the cumulative total errors located for each of the selected options at 220. In addition, output reports 230 are generated for each of the options selected including all listings found with the indicated error or omission.

Table 1 is an alphabetical list of all the data fields in one embodiment of a relational database for television program listings. The table shows the format, size, and data range for each field. Not every data field is used for each database entry. For example, fields such as actor_name, mpaa_rating, mpaa_ra_description, mpaa_reason, mpaa_reason_code, star-rating, and year will generally be used only for movies. Those of ordinary skill in the art will recognize that the disclosed data verification utility may be designed to operate with any database configuration. Table 2 illustrates the structure of the relational database of FIG. 1 showing how the various database fields are organized as well as the primary keys (pk) and foreign keys. The bold typeface indicates the name of a table in the database and the entries listed underneath are the fields that comprise the table.

TABLE 1

| Element | Definition | Referenced By |
| --- | --- | --- |
| actor_name | = \name of actor\<br>type VARCHAR2 (64) | Movie_Credits |
| available_until | = \date & time YCTV program ends\<br>type DATE | Schedule |
| barker_description | = \text describing 'barker_type'\<br>type VARCHAR2 (32) | Barker_Type |
| barker_type | = \video barker type\<br>type NUMBER (4, 0)<br>range {0 . . . 5} | Barker_Type<br>Instance_Time<br>Channel_Map |
| billing | = \actor credit ranking\<br>type NUMBER (2, 0) | Movie_Credits |
| category | = \program category\<br>type VARCHAR2 (16)<br>unique | Category<br>Program |
| channel_number | = \headend channel number\<br>type NUMBER (7, 0)<br>range {0 . . . 9,999,999} | Channel_Map<br>Instance_Time<br>Channel_Map_PPV |
| channel_label | = \parallel channel station label\<br>type VARCHAR2 (16)<br>Channel_Map_PPV | Channel_Map<br>Instance_Time |
| character | = \8 bit ASCII character\<br>type NUMBER (3, 0)<br>range {0 . . . 255} | Pixel_Map |
| characters_field_width | = \platform field width (characters)\<br>type NUMBER (4, 0)<br>range {1 . . . 9,999} | Platform_Field |
| closed_caption | = \closed captioning indicator\<br>type NUMBER (5, 0) [BOOLEAN]<br>range {YES ¦ NO} | Schedule |
| color_class | = \color state of movie\<br>type VARCHAR2 (16)<br>range {'BW' ¦ 'Color' ¦ 'Colorized'} | Color_Class<br>Schedule |
| company_address | = \cable company address<br>type VARCHAR2 (512) | Cable_Company |
| company_id | = \cable system company identifier\<br>type NUMBER (8, 0)<br>range {1 . . . 99,999,999} | Cable_Company<br>Company_Contact<br>MSO_Company |
| company_logo | = \cable company logo\<br>type VARCHAR2 (512) | Cable_Company |
| company_name | = \cable company description\<br>type VARCHAR2 (512) | Cable_Company |
| company_owner | = \cable company name\<br>type VARCHAR2 (128) | Cable_Company |
| contact_email | = \contact electronic mail address\<br>type VARCHAR2 (64) | MSO_Contact<br>Company_Contact |
| contact_fax | = \contact fax phone number\<br>type VARCHAR2 (16) | MSO_Contact<br>Company_Contact |
| contact_name | = \contact name\<br>type VARCHAR2 (64) | MSO_Contact<br>Company_Contact |
| contact_phone | = \contact phone number\<br>type VARCHAR2 (16) | MSO_Contact<br>Company_Contact |
| day | = \day of week code\<br>type CHAR<br>range {'N' ¦ 'M' ¦ 'T' ¦ 'W' ¦ 'H' ¦ 'F' ¦ 'S'} | Day<br>Channel_Map<br>Channel_Map_PPV |
| day_description | = \day of week description\<br>type VARCHAR2 (32)<br>range {'Sunday' ¦<br>    'Monday' ¦<br>    'Tuesday' ¦<br>    'Wednesday' ¦<br>    'Thursday' ¦<br>    'Friday' ¦<br>    'Saturday' } | Day |
| daylight_savings_time | = \daylight savings time indicator\<br>type NUMBER (5, 0) [BOOLEAN]<br>range {YES ¦ NO} | Headend |
| do_textfit | = \perform textfit on associated text\<br>type NUMBER (5, 0) | Platform<br>Field_Type |
| end_time | = \station channel broadcast end time\<br>type DATE | Channel_Map |
| event_datetime | = \EST timestamp of broadcast event\<br>type DATE | Schedule<br>Schedule_Text |
| event_price | = \broadcast event cost to viewer\<br>type NUMBER (7, 2)<br>range {0.00 . . . 99,999.99} | Schedule<br>Channel_Map_PPV |
| field_description | = \field type description\<br>type VARCHAR2 (32) | Field_Type |

TABLE 1-continued

| Element | Definition | Referenced By |
|---|---|---|
| | 1 TVG title<br>2 Ext title<br>3 Alt1 title<br>4 Grid title<br>5 Short copy<br>6 Long copy<br>7 Promo copy<br>8 Originator<br>9 Guideline<br>100 TVG title 30 min.<br>101 TVG title 60 min.<br>102 TVG title 90 min.<br>103 TVG title 120 min.<br>200 Ext title 30 min.<br>201 Ext title 60 min.<br>202 Ext title 90 min.<br>203 Ext title 120 min. | |
| field_lines | = \number of screen field lines\<br>type NUMBER (2, 0)<br>range {1 . . . 99} | Platform_Field |
| field_source_type | = \source of a text fitted value\<br>type NUMBER (3,0) | Platform_Field<br>Platform_Value |
| field_type | = \type of named field on platform\<br>type NUMBER (3, 0)<br>Platform_Field<br>Program_Map<br>Schedule_Text | Field_Type<br>Platform_Value |
| font_type | = type of font used on platform\<br>type NUMBER (4, 0)<br>range {1 . . . 9,999} | Font_Type<br>Character_Pair_Kerning<br>Platform_Field |
| group_description | = \physical headend group identifier\<br>type VARCHAR2 (128) | Groups |
| group_id | = \logical system group identifier\<br>type NUMBER (8, 0)<br>range {1 . . . 99,999,999}<br>unique | Groups<br>Groups_System |
| guideline_weight | = \TV Guide recommendation level\<br>type NUMBER (2, 0)<br>range {0 . . . 4} | Schedule |
| headend_id | = \target headend identifier\<br>type VARCHAR2 (32)<br>unique | Headend<br>System_Headend<br>Map_Time |
| instance_end_datetime | = \end date/time of scheduled event\<br>type DATE | Instance_Time |
| instance_start_datetime | = \start date/time of scheduled event\<br>type DATE | Instance_Time |
| kerning_value | = \kerning space value (pixels)\<br>type NUMBER (2, 0)<br>range {1 . . . 99} | Character_Pair_Kerning |
| last_verify_time | = \last verification date and time\<br>type DATE | Log_Control |
| left_char | = \left character of kerning pair\<br>type NUMBER (3, 0)<br>range {0 . . . 255} | Character_Pair_Kerning |
| live_indicator | = \program broadcast state (live/taped)\<br>type NUMBER (5, 0)<br>range {YES | NO} | Program |
| load_date | = \last load process date\<br>type DATE | Log_Control |
| load_end_time | = \last load process end time\<br>type DATE | Log_Control |
| load_start_time | = \last load process start time\<br>type DATE | Log_Control |
| log_file_drive | = \log file drive specification\<br>type VARCHAR2 (128) | Log_Control |
| log_id | = \log control file identifier\<br>type NUMBER (2, 0)<br>range {1}<br>unique | Log_Control |
| log_file_seqno | = \last log file sequence number\<br>type NUMBER (2, 0) | Log_Control |
| long_station_id | = \station identifier long form\<br>type VARCHAR2 (64) | Station |
| long_station_name | = \station name (long form)\<br>type VARCHAR (512) | Station |
| map_end_time | = \channel map block start time\<br>type DATE | Map_Time |

TABLE 1-continued

| Element | Definition | Referenced By |
|---|---|---|
| map_start_time | = \channel map block end time\<br>type DATE | Map_Time |
| map_time_id | = \channel map block designator\<br>type VARCHAR2 (48)<br>unique | Map_Time<br>Instance_Time<br>Channel_Map |
| | Channel_Map_PPV | |
| mpaa_rating | = \MPAA rating character\<br>type CHAR<br>range {'N' \| 'G' \| 'P' \|<br>'3' \| 'R' \| '7'} | MPAA_Rating<br>Movie |
| mpaa_rating_code | = \MPAA rating code\<br>type CHAR (10) | |
| mpaa_ra_description | =\MPAA rating code description\<br>type VARCHAR2 (128)<br>range {'NR - Not Rated' \|<br>   'G - General Audiences' \|<br>   'PG - Parental Guidance' \|<br>   'PG-13 - Parental Guidance (some material not suitable<br>for under 13 yrs)' \|<br>   'R - Restricted' \|<br>   'NC-17 - No one under 17 admitted'} | MPAA_Rating |
| mpaa_reason | = \MPAA rating reason description\<br>type VARCHAR2 (64)<br>range {'adult themes' \|<br>   'adult situations' \|<br>   'sexual situations' \|<br>   'strong language' \|<br>   'violence' \|<br>   'nudity' \|<br>   'partial nudity'} | MPAA_Reason<br>Movie_MPAA_Reason |
| mpaa_reason_code | = \MPAA rating reason code\<br>type CHAR<br>range {'T' \| 'A' \| 'S' \|<br>'L' \| 'V' \| 'N' \| 'P'} | MPAA_Reason |
| mso_address | = \multi system owner address\<br>type VARCHAR2 (512) | MSO |
| mso_rid | = \multi system owner identifier\<br>type NUMBER (8, 0)<br>range {1 . . . 9,999,999} | MSO<br>MSO_Contact<br>MSO_Company |
| mso_logo | = \multi system owner logo\<br>type VARCHAR2 (512) | MSO |
| mso_name | = \multi system owner description\<br>type VARCHAR2 (512) | MSO |
| mso_owner | = \multi system owner name\<br>type VARCHAR2 (128) | MSO |
| onscreen_text_id | = \TV Guide on screen name\<br>type NUMBER<br>Text_Catalog (text_id) | Edited_Station<br>Platform_Station |
| original_air_date | = \YCTV event first broadcast\<br>type DATE<br>range {SYSTEM_MIN_DATE . . . SYSTEM_MAX_DATE} | Schedule |
| pin | = \TV Guide program identifier\<br>type CHAR (20)<br>format pppppppp.ssssssss.XX<br>where (XX is<br>   MV = movie \|<br>   SR = series \|<br>   MS = miscellaneous \|<br>   SM = series master (for lock-out) \|<br>   UN = unknown (is not assigned) ) | Program |
| pixel_map | = \character pixel set identifier\<br>type NUMBER (2, 0)<br>range {1 . . . 99} | Valid_Pixel_Map<br>Font_Type<br>Pixel_Map |
| pixel_width | = \width of character (pixels)\<br>type NUMBER (2, 0)<br>range {1 . . . 99} | Pixel_Map |
| pixels_field_width | = \width of platform field (pixels)\<br>type NUMBER (4, 0)<br>range {1 . . . 9,999} | Platform_Field |
| platform_text_id | = \platform field text catalog id\<br>type NUMBER<br>Text_Catalog (text_id) | Platform_Value<br>Schedule_Text |
| platform_id | = \target display unit platform\<br>type VARCHAR2 (16)<br>range {'Catalyst Visual' \|<br>   'ESP 8600x' \|<br>   'ESP SA Grid' \| | Platform<br>Platform_Field<br>Platform_Station<br>Platform_Value<br>Edited_Station |

TABLE 1-continued

| Element | Definition | Referenced By |
|---|---|---|
| | 'ESP Turbo' \| <br> 'Starnet Passive'} | System |
| preview_end_offset | = \PPV preview window end time offset\ <br> type DATE | Schedule <br> Channel_Map_PPV |
| preview_start_offset | = \PPV preview window start time offset\ <br> type DATE | Schedule <br> Channel_Map_PPV |
| print_run_time | = \actual broadcast event run time\ <br> type NUMBER (7, 0) <br> range {0 ... 9,999,999} <br> where (0 := continuous running time) | Schedule |
| program_id | = \program identifier\ <br> type NUMBER <br> unique <br>    Movie_MPAA_Reason <br>    Program_Map <br>    Schedule | Program <br> Movie <br> Movie_Credits |
| program_text_id | = \program event field text identifier\ <br> type NUMBER <br>    Schedule_Text <br>    Text_Catalog (text_id) | Program_Map <br> Platform_Value |
| program_type | = \type of broadcast event <br> type VARCHAR2 (8) <br> range {'Other' \| <br>    'PPV' \| <br>    'YCTV' \| <br>    'NVOD'} | Program Type <br> Schedule |
| purchase_call_phone | = \PPV purchase call phone number\ <br> type VARCHAR2 (16) | Schedule <br> Channel_Map_PPV |
| purchase_end_offset | = \PPV purchase window end time offset\ <br> type NUMBER (4, 0) | Schedule <br> Channel_Map_PPV |
| purchase_start_offset | = \PPV purchase window start time offset\ <br> type NUMBER (4, 0) | Schedule <br> Channel_Map_PPV |
| right_char | = \right character of kerning pair\ <br> type NUMBER (3, 0) <br> range {0 ... 255} | Character_Pair_Kerning |
| role_name | = \alias actor name\ <br> type VARCHAR2 (64) | Movie_Credit |
| searchtype | = \word search type - whole word or not\ <br> type NUMBER (2, 0)? <br> range {0 \| 1} | Wordlist |
| series_id | = \program series identifier\ <br> type NUMBER (7, 0) <br> range {1 ... 9,999,999} | Schedule |
| seqno | = \sequence number to maintain order\ <br> type NUMBER (2, 0) <br> range {1 ... 99} | Day <br> Movie_MPAA_Reason |
| slot_run_time | = \broadcast event run time (minutes)\ <br> type NUMBER (7, 0) <br> range {0 ... 9,999,999} <br> where (0 := continuous running time) | Schedule |
| star_rating | = \TV Guide movie quality rating\ <br> type NUMBER (2, 0) <br> range {0 ... 5} | Movie |
| start_time | = \broadcast station channel start time\ <br> type DATE | Channel_Map <br> Channel_Map_PPV |
| station_description | = \station type description\ <br> type VARCHAR2 (32) <br> range {'Broadcast' \| <br>    'Cable' \| <br>    'Premium' \| <br>    'Select Entertainment' \| <br>    'PPV' \| <br>    'Hits at Home' \| <br>    'YCTV' \| | Station_Type |
| station_id | = \broadcast station call letters\ <br> type VARCHAR2 (16) <br> unique <br>    Platform_Station <br>    Schedule <br>    Channel_Map <br>    Channel_Map_PPV <br>    Schedule_Text | Station <br> Edited_Station <br> Instance_Time |
| station_priority | = \schedule conflict resolution priority\ <br> type NUMBER (2, 0) <br> range (1 ... 5) | Channel_Map <br> Instance_Time <br> Channel_Map_PPV |
| station_type | = \type of station class\ <br> type NUMBER (2, 0) | Station_Type <br> Station |

TABLE 1-continued

| Element | Definition | Referenced By |
|---|---|---|
| | range {10 . . . 99} | |
| system_description | = \system description\<br>type VARCHAR2 (64) | System |
| system_id | = \system identifier \<br>type NUMBER (8, 0)<br>range {1 . . . 99,999,999}<br>unique | System<br>Groups_System<br>System_Headend |
| text | = \catalog text character string\<br>type VARCHAR2 (512) | Text_Catalog |
| text_id | = \catalog text identifier\<br>type NUMBER | Text_Catalog |
| timezone | = \broadcast event time zone\<br>type CHAR (3)<br>range {'ET' ¦ 'CT' ¦<br>    'MT' ¦ 'CT' ¦<br>    'AT' ¦ 'HAT' ¦<br>    'LT' ¦ 'ST' ¦ | Timezone<br>Headend |
| touched | = \text last touched timestamp\<br>type DATE | Text_Catalog |
| tz_description | = \timezone description\<br>type VARCHAR2 (64) | Timezone |
| word | = \proscribed work\<br>type VARCHAR2 (50)<br>unique | Wordlist |
| year | = \movie release year\<br>type NUMBER (4, 0)<br>range {0 . . . 9,999} | Movie |

TABLE 2

| Table | Attribute/Primary Key | Foreign Key Table |
|---|---|---|
| Barker_Type | | |
| | pk    = barker_type<br>barker_type<br>barker_description | |
| Cable_Company | | |
| | pk    = company_id<br>company_id<br>company_name<br>company_owner<br>company_address<br>company_logo | |
| Category | | |
| | pk    = category<br>category | |
| Channel_Map | | |
| | pk    =map_time_id<br>       +channel_number<br>       +channel_label<br>       +station_priority<br>       +day<br>       +start_time | |
| | map_time_id<br>channel_number<br>channel_label<br>station_priority | Map_Time |
| | day<br>start_time<br>end_time | Day |
| | station_id<br>barker_type | Station<br>Barker_Type |
| Channel_Map_PPV | | |
| | pk    =map_time_id<br>       +channel_number<br>       +channel_label<br>       +station_priority<br>       +day<br>       +start_time | |
| | map_time_id<br>channel_number<br>channel_label<br>station_priority | Map_Time |
| | day<br>start_time | Day |

TABLE 2-continued

| Table | Attribute/Primary Key | Foreign Key Table |
|---|---|---|
| | purchase_start_offset | |
| | purchase_end_offset | |
| | purchase_call_phone | |
| | preview_start_offset | |
| | preview_end_offset | |
| | event_price | |
| Character_Pair_Kerning | | |
| | pk  =font_type | |
| |     +left_char | |
| |     +right_char | |
| | font_type | Font_Type |
| | left_char | |
| | right_char | |
| | kerning_value | |
| Color_Class | | |
| | pk  =color_class | |
| | color_class | |
| Company_Contact | | |
| | pk  =company_id | |
| |     +contact_name | |
| | company_id | Cable_Company |
| | contact_name | |
| | contact_phone | |
| | contact_fax | |
| | contact_email | |
| Day | | |
| | pk  =day | |
| | day | |
| | day_description | |
| | seqno | |
| Edited_Station | | |
| | pk  =platform_id | |
| |     +station_id | |
| | platform_id | Platform |
| | station_id | Station |
| | onscreen_text_id | Text_Catalog (tex_id) |
| Field_Type | | |
| | pk  =field_type | |
| | field_type | |
| | field_description | |
| | do_textfit | |
| Font_Type | | |
| | pk  =font_type | |
| | font_type | |
| | pixel_map | Valid_Pixel_Map |
| Groups | | |
| | pk  =group_id | |
| | group_id | |
| | group_description | |
| Groups_System | | |
| | pk  =group_id | |
| |     +system_id | |
| | group_id | Groups |
| | system_id | System |
| Headend | | |
| | pk  =headend_id | |
| | headend_id | |
| | timezone | Timezone |
| | daylight_savings_time | |
| Instance_Time | | |
| | pk  =map_time_id | |
| |     +channel_number | |
| |     +channel_label | |
| |     +station_priority | |
| |     +instance_start_datetime | |
| | map_time_id | Map_Time |
| | channel_number | |
| | channel_label | |
| | station_priority | |
| | instance_start_datetime | |
| | instance_end_datetime | |
| | station_id | Station |
| | barker_type | Barker_Type |
| Log_Control | | |
| | pk  =log_id | |
| | log_id | |
| | load_date | |

TABLE 2-continued

| Table | Attribute/Primary Key | Foreign Key Table |
|---|---|---|
| | load_start_time | |
| | load_end_time | |
| | last_verify_time | |
| | log_file_seqno | |
| | log_file_drive | |
| Map_Time | | |
| | pk =map_time_id | |
| | map_time_id | |
| | headend_id | Headend |
| | map_start_time | |
| | map_end_time | |
| Movie | | |
| | pk =program_id | |
| | program_id | Program |
| | mpaa_rating | MPAA_Rating |
| | year | |
| | star_rating | |
| Movie_Credits | | |
| | pk =program_id | |
| | +billing | |
| | program_id | Movie |
| | billing | |
| | actor_name | |
| | role_name | |
| Movie_MPAA_Reason | | |
| | pk =program_id | |
| | +mpaa_reason | |
| | program_id | Movie |
| | mpaa_reason | MPAA_Reason |
| | seqno | |
| MPAA_Rating | | |
| | pk =mpaa_rating | |
| | mpaa_rating | |
| | mpaa_rating_code | |
| | mpaa_ra_description | |
| MPAA_Reason | | |
| | pk =mpaa_reason | |
| | mpaa_reason | |
| | mpaa_reason_code | |
| MSO | | |
| | pk =mso_id | |
| | mso_id | |
| | mso_name | |
| | mso_owner | |
| | mso_address | |
| | MSO_logo | |
| MSO_Company | | |
| | pk mso_id | |
| | +company_id | |
| | mso_id MSO | |
| | company_id | Cable_Company |
| MSO_Contact | | |
| | pk =mso_id | |
| | +contact_name | |
| | mso_id MSO | |
| | contact_name | |
| | contact_phone | |
| | contact_fax | |
| | contact_email | |
| Pixel_Map | | |
| | pk =pixel_map | |
| | +character | |
| | pixel_map | Valid_Pixel_Map |
| | character | |
| | pixel_width | |
| Platform | | |
| | pk =platform_id | |
| | platform_id | |
| | do_textfit | |
| Platform_Field | | |
| | pk =platform_id | |
| | +field_type | |
| | platform_id | Platform |
| | field_type | Field_Type |
| | characters_field_width | |
| | pixels_field_width | |
| | field_lines | |

TABLE 2-continued

| Table | Attribute/Primary Key | Foreign Key Table |
|---|---|---|
| | field_source_type | Field_Type (field_type) |
| | font_type | Font_Type |
| Platform_Station | | |
| | pk =platform_id +station_id | |
| | platform_id | Platform |
| | station_id | Station |
| | onscreen_text_id | Text_Catalog (text_id) |
| Platform_Value | | |
| | pk =platform_id +field_type +program_text_id | |
| | platform_id | Platform |
| | field_type | Field_Type |
| | program_text_id | Text_Catalog (text_id) |
| | platform_text_id | Text_Catalog (text_id) |
| | field_source_type | Field_Type (field_type) |
| Program | | |
| | pk = program_id | |
| | program_id | |
| | pin | |
| | live_indicator | |
| | category | Category |
| Program_Map | | |
| | pk =program_id +field_type | |
| | program_id | Program |
| | field_type | Field_Type |
| | program_text_id | Text_Catalog (text_id) |
| Program_Type | | |
| | pk =program_type | |
| | program_type | |
| Schedule | | |
| | pk =station_id +event_datetime | |
| | station_id | Station |
| | event_datetime | |
| | series_id | |
| | program_id | Program |
| | closed_caption | |
| | color_class | Color_Class |
| | slot_run_time | |
| | print_run_time | |
| | event_price | |
| | purchase_start_offset | |
| | purchase_end_offset | |
| | purchase_call_phone | |
| | preview_start_offset | |
| | preview_end_offset | |
| | original_air_date | |
| | available_until | |
| | guideline_weight | |
| | program_type | Program_Type |
| Schedule_Text | | |
| | pk =station_id +event_datetime +field_type | |
| | station_id | Station |
| | event_datetime | |
| | field_type | Field_Type |
| | program_text_id | Text_Catalog (text_id) |
| | fk =station_id +event_datetime | Schedule |
| Station | | |
| | pk =station_id | |
| | station_id | |
| | station_type | Station_Type |
| | long_station_name | |
| Station_Type | | |
| | pk =station_type | |
| | station_type | |
| | station_description | |
| System | | |
| | pk =system_id | |
| | system_id | |
| | system_description | |
| | platform_id | Platform |

TABLE 2-continued

| Table | Attribute/Primary Key | Foreign Key Table |
|---|---|---|
| System_Headend | | |
| | pk =system_id +headend_id | |
| | system_id | System |
| | headend_id | Headend |
| Text_Catalog | | |
| | pk =text_id | |
| | text_id | |
| | text | |
| | touched | |
| Timezone | | |
| | pk =timezone | |
| | timezone | |
| | tz_description | |
| Valid_Pixel_Map | | |
| | pk =pixel_map | |
| | pixel_map | |
| Wordlist | | |
| | pk =word | |
| | word | |
| | searchtype | |

Missing Stations

As shown in FIG. 2, in order to check for missing stations, the user must designate a station list file 214. The station list file may contain every station in the database, a subset of stations representing the stations in a particular cable system, any user defined group of stations, or a single station. In addition, the station list file contains a data field for each station indicating the daily on-air times for that station. The listings database (i.e., the station_id field) is then searched against this file to determine if each station in the station list file is included in the database. If missing stations are found, the total number of missing stations is incremented and displayed and the name of the missing station is written to an output file.

Schedule Gaps and Overlaps

Figure 3:
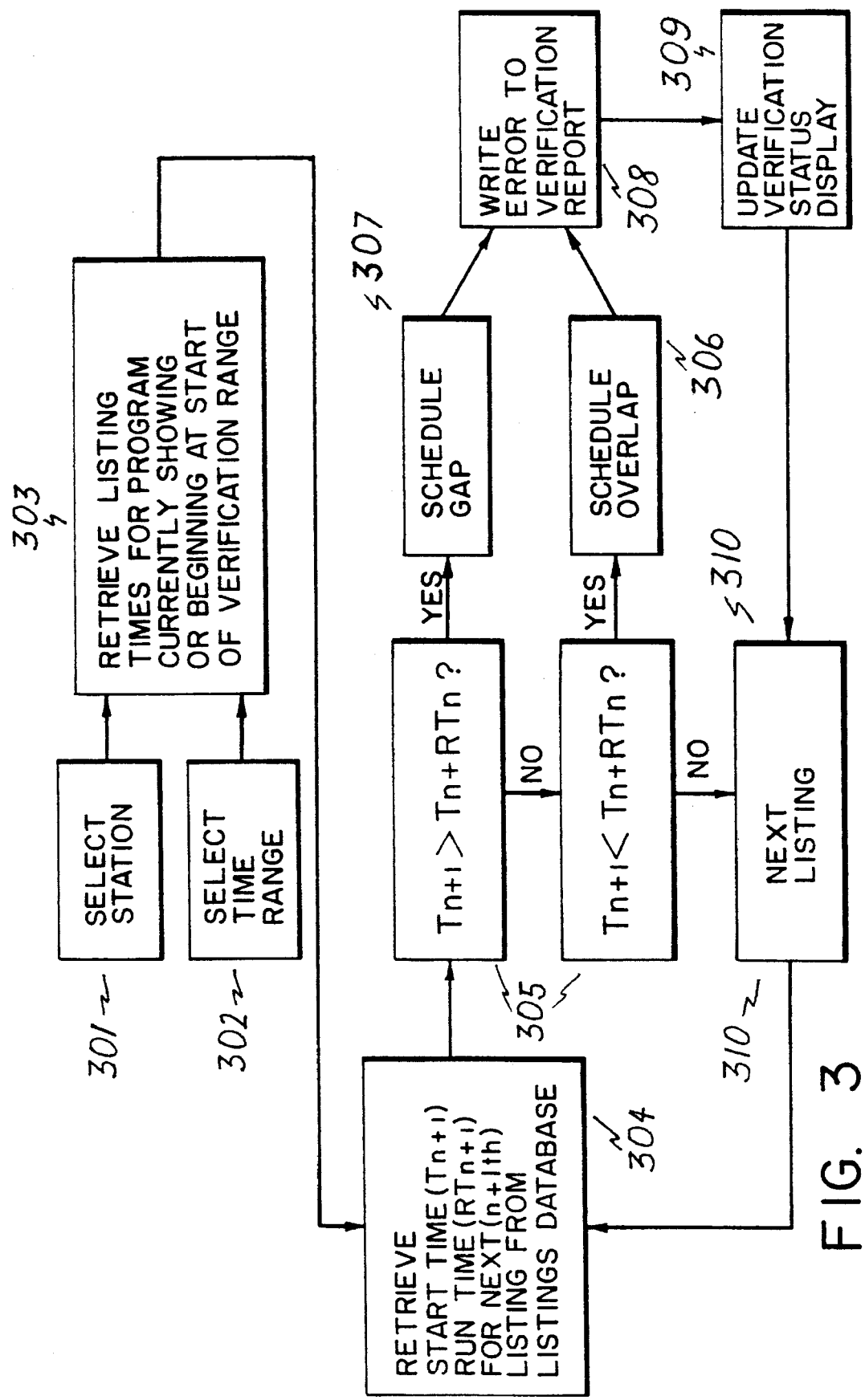
FIG. 3 is a flow chart showing the operation of the schedule gaps and overlaps verification step of one embodiment of the data verification system of the invention herein.

The schedule gap and overlap option operates as shown in FIG. 3. The flow chart shows the operation for a single station selected at 301 but operation is the same for each station in a station list file. First, a time range is selected for checking for gaps and overlaps at 302. The system then checks the database at 303 to determine if the beginning of the time range coincides with the start of a program and begins the process with this listing. If the beginning of the time range intersects a program already showing, the system begins the process with this listing. The start time (start_time) for the first listing to be checked is then retrieved from the database at 304. If there are no gaps or overlaps in the schedule, the start time of the next listing should be the start time of the previous listing plus the slot run time (slot_run_time) of the previous listing. Each listing is then checked in succession according to the following equations 305 used to determine whether there is a overlap 306 or a gap 307:

$T_{n+1}=T_n+RT_n$ (schedule is correct)

$T_{n+1}>T_n+RT_n$ (schedule gap)

$T_{n+1}<T_n+RT_n$ (schedule overlap)

where $T_n$ represents the start time and $RT_n$ the slot run time for the nth listing in the database. Each entry in the database is checked independently of the other entries so that a schedule gap or overlap for a particular pair of programs will not affect all of the subsequent listings in the database. For stations that do not broadcast 24 hours a day, an off-the-air place holder is inserted into the database and treated as a program. Schedule overlaps 306 and gaps 307 are written to the verification report at 308 and displayed on the status screen at 309. The next listing 310 is then retrieved at 304 and the process repeated.

For some television stations, particularly premium stations, a small gap or overlap (i.e., 5 minutes) in programs may be permitted. For example, on a premium movie channel, a movie may begin 5 minutes or so after the slot time so that if the previous movie runs 3 minutes into the slot time, there is no actual overlap. Similarly, a movie with a running time of, e.g., 87 minutes will end prior to the beginning of the next time slot. However, it is common for premium stations to fill this apparent gap with advertising or other promotional material. If is the case, the equations may be modified as follows to reflect the fact that such small gaps and overlaps are permissible:

$T_{n+1}=(T_n+RT_n)\pm 5$ minutes (schedule is correct)

$T_{n+1}>T_n+RT_n+5$ minutes (schedule gap)

$T_{n+1}<T_n+RT_n-5$ minutes (schedule overlap)

Missing Titles, Copy, Fields, and Movie Ratings

The missing titles, missing copy, missing fields, and missing movie ratings utilities operate as follows. For each of these options, the listings are checked for the missing information by searching the designated field or fields. For missing titles, all of the different titles for a program may be checked, including the full (TVG) title and the various shortened versions (i.e., for 30, 60, 90, and 120 minute grid boxes). For the missing copy option, the long copy, short copy, and promo copy fields may be checked. In the database described by Tables 1 and 2, all textual data (including program titles, copy, and originator) for a program is stored in a Text_Catalog table, which is indexed using a text_id. The text_id is obtained from another table, such as Program_Map, which consists of an array of pointers into the Text_Catalog. The Program_Map table is indexed using the program_id and field_type. There is a text pointer for each of the different field types as indicated under the field_description in Table 1. Using a program_id, all text data associated with a program may be retrieved.

For the missing movie rating option, the MPAA_rating field is checked. For the missing fields option, all fields which should be present for a particular listing (according to the operating rules of the EPG) are checked. When any of the above missing fields is found, the appropriate count is incremented and displayed. In addition, the date, start time, station identification, and title (for missing copy and MPAA ratings) are written to the appropriate output verification report.

The missing copy option will check for missing copy for all the listings that should include copy such as movies, live sports, and pay-per-view programs. The missing movie ratings option checks all premium channels and pay-per-view events for movie ratings since only these channels will air un-edited movies. It is of course also possible to generate a single output verification report including all of the listings with missing information. Thus, a single file can be generated listing all listings with missing titles, copy, and/or movie ratings.

Lengthy Titles and Lengthy Copy

The operation of the lengthy titles and lengthy copy options is as follows. Based on the platform or platforms selected by the user (the Platform_id field), the system checks a table in the database that indicates the various different display formats for each listing. For example, if the platform supports both an interactive and channel guide type EPG, each with different display characteristics, the table will indicate that each should be included in the database. Thus, for a two hour movie, the system will check that there are titles for each listing tagged as 30, 60, 90, and 120 minute listings to fit into the different sized grid cells for each of the two types of EPGs. If any of the required titles are missing, the system will write sufficient information to the output report to identify the missing title. In addition, the system checks the multiple versions of the titles in the database to ensure that each fits into the designated space for the particular platform. The space required for display of the listings is determined by consulting the table listing the available fonts for the platform and calculating the space required based on the font and character pair kerning. The character_pair_kerning table shown in Table 2 returns the kerning value for character pairs that are kerned which is used to determine the actual space required for display of a character pair. In order to avoid calculating the space required for display of an entire word each time the word is encountered in the database, a look-up table may be built including, for each different font, the space required for display of a word, accounting for character pair kerning. In this manner, the look up table is consulted prior to actually calculating the required space. If the word is in the look-up table, it is not necessary to calculate the space requirement. If it is not, following calculation of the space requirement, the word is added to the look-up table for future reference. Alternatively, in order to avoid recalculation of whether any particular title will fit in a particular display for a particular platform, an appropriate tag is applied to each title that previously has been text-fitted. Then, when the verification process is run, in order to determine if all text-fitted titles are present, the system checks for the presence of titles previously tagged for the specific platform.

For lengthy copy, each listing which, according to the operating rules of the EPG, should include copy, is checked. Based on the platform chosen, the system consults a table in the database that indicates the space available for copy. Lengthy copy is then checked in the same manner as lengthy titles. If the space required for display of the title or copy exceeds the available space, the count is incremented and displayed and the platform, date, start time, station identification and lengthy title or copy are written to the appropriate verification report.

Editorial Errors

The above options check for fields that are completely missing data and fields that include data that exceeds the designated space in which it must fit. They do not, however, detect errors in the data itself. The editorial errors option supplements these options by checking for particular errors in the data fields. This option searches the listings for the more common types of errors found in the database. These include duplicated movie titles and years, cross references to other days of the programming week (for programs repeating each day), and the phrase "at press time" (often used where at the time the database is compiled certain information about a program is not yet known). For each such editorial error located, the count is incremented and displayed, and the date, time, station identification, and type of error are written to the output verification file.

The above editorial errors are only a few of the errors that may occur in the database. If additional types of errors are detected, these may also be checked by the editorial error option.

Inappropriate Language

The inappropriate language option is similar to the editorial errors option in that it checks the listings database for certain words and phrases that are not appropriate for an EPG. All such words and phrases are included in the language dictionary file. The database is then checked for any character strings matching these words and phrases. If any matches are found, the count is incremented by one and displayed and the date, start time, station identification, and inappropriate language found are written to the output file. The inappropriate language utility may be configured to check each database field containing textual data. Alternatively, only certain text fields may be designated for checking against the inappropriate language file.

Other Verification Options

Operation of the other verification options is similar to that of the options enumerated above. Missing program type, slot time, run time, program origin, PPV price and PPV promotional copy may be implemented in the same manner as the other missing field options. The PPV event on a non-PPV station and non-PPV event on a PPV station options are implemented by comparing the program_type and station_type fields for a program.

System Implementation

Figure 4:
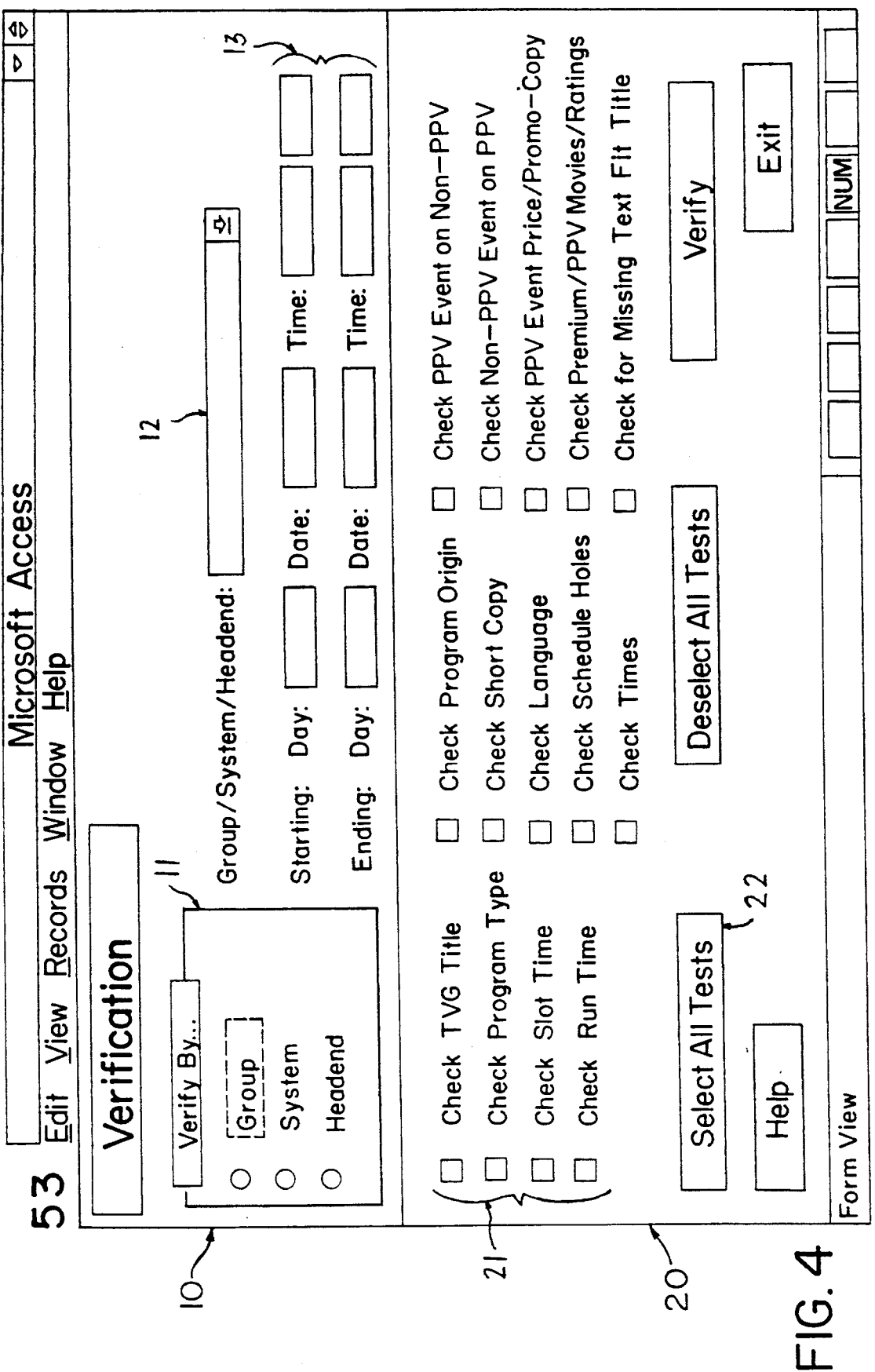
FIG. 4 is an illustration of a user interface for setting the parameters of one embodiment of the data verification system of the invention herein.
Figure 5:
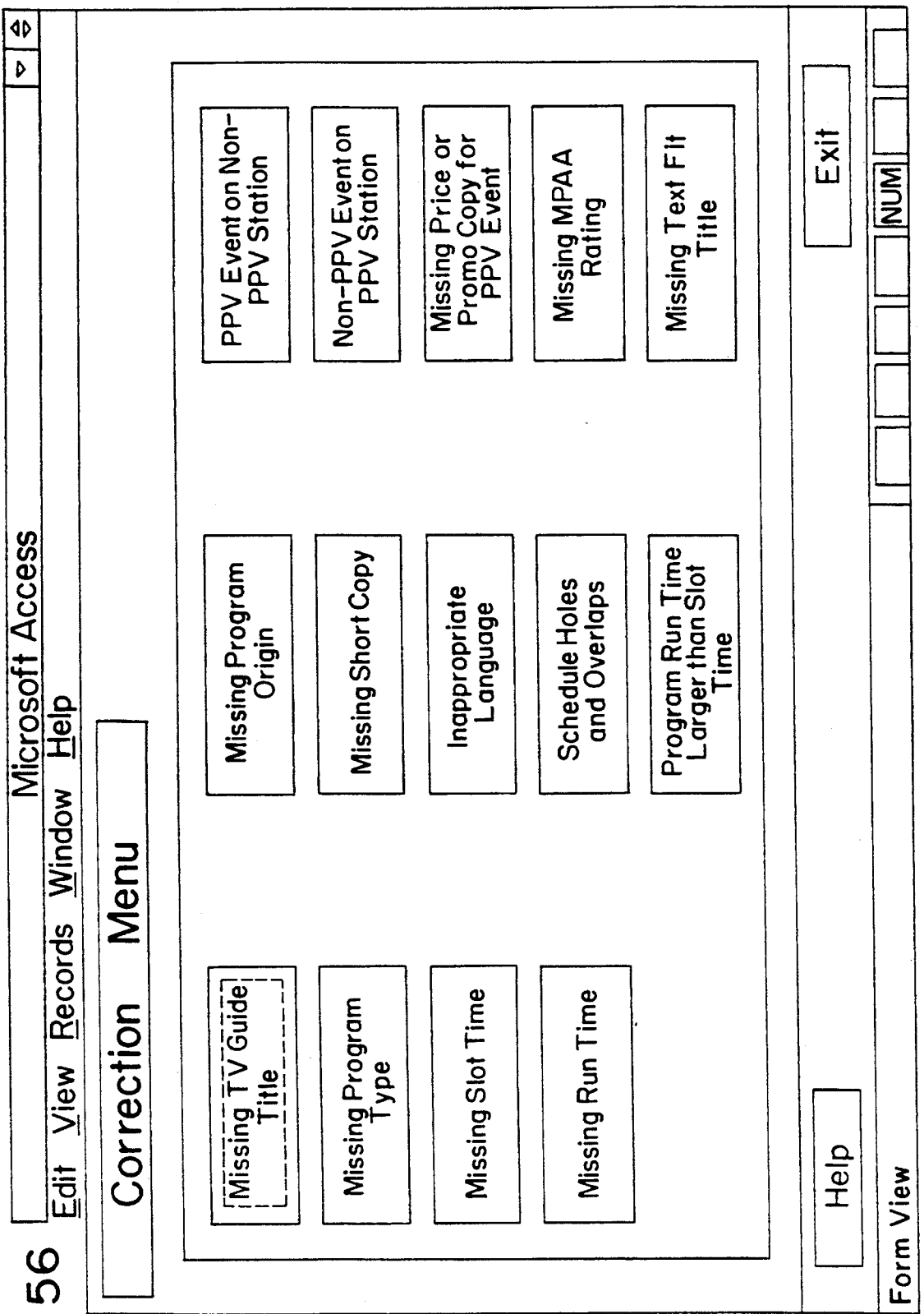
FIG. 5 is an illustration of a post-verification correction menu of one embodiment of the data verification system of the invention herein.

It will be recognized by those of skill in the art that the system may be implemented on any of a number of digital computers. In one embodiment, a 486 based personal computer system may be used. Alternatively, due to the large amount of data to be processed, a more powerful workstation computer may be used. A mass storage device, such as an optical disc, hard drive, or magnetic tape is used to store the database. The data verification utility may be resident on the computer which includes a display device and keyboard for entry of user commands. In one embodiment, the utility is implemented in a Microsoft Windows environment for maximum user friendliness. FIG. 4. shows a verification set-up screen for selecting the various verification options. In the top portion of the screen 10, the user selects whether to run verification on a group of cable systems, a single cable system, or a single head end at 11. The particular group, system, or headend is selected in box 12. Also in the top portion of screen 10, the user selects the starting and ending times on which the data verification is run at 13. In the lower portion of the screen 20, the various verification options 21 are selected. Alternatively, all tests may be selected using a single button 22. After verification is run, the user is presented with correction menu 30 shown in FIG. 5. The correction menu permits the user to correct the errors by type of error. Upon selecting an error type for correction, the user is presented with the correction editor screen 40 shown in FIG. 6. The correction editor screen displays the values of the different fields for the program listing containing an error so that the user may make the appropriate changes.

Once the data is processed by the data verification utility and the additions, changes, and edits are made to the listings database, the data for a particular cable system is extracted and prepared for transmission to the cable system. At this stage, the data corresponding to a particular channel map is extracted from the database and converted to ASCII format or a binary data format readable by the cable system. The data file may be transmitted to the cable system by any of a number of means such as by satellite, telephone line, portable storage medium, or broadcast.

In an alternate embodiment, the data verification utility may be resident at each of the cable system head-ends. In this manner, the cable system's individual data file is extracted from the program listings database and transmitted to the cable system. The various checking options associated with the utility may then be run at the cable system head end prior to transmission of the EPG data to individual viewers. Thus, only the data for stations carried by the particular cable system is checked. The advantage of this arrangement is that it provides for listings editing capabilities at each cable system so that errors not detected by the EPG provider may be corrected and last minute changes reflected in the data provided to the viewers.

The code for a particular computer program to implement the invention disclosed herein will be readily apparent to those skilled in the art of video system programming and graphic display based on the description contained herein and associated figures. It will also be appreciated by those skilled in the art that there can be departure from the specific embodiment of the invention described herein without departing from the true scope of the claims appended hereto.

We claim:

1. A data verification system for automatically verifying the integrity of a database of program schedule information for an electronic television program guide comprising:

storage means for storing a database of television program schedule listings, said database comprising a plurality of data fields for a plurality of television stations;

means for selecting a station from said plurality of stations for verification of one or more of said data fields for said selected station;

means for selecting a time range for said verification of said one or more data fields;

data processing means for automatically analyzing said data fields for said selected station in said database for at least one of schedule gaps and schedule overlaps in the schedule data for said station, and editing means for editing said data fields for said selected station in said database.

2. The system of claim 1 further comprising transmitting means for transmitting said database to a remote location.

3. The system of claim 1 wherein said data processing means further automatically analyzes said data fields for said selected station in said database for at least one of missing titles, copy, and fields.

4. The system of claim 1 wherein said data processing means further automatically analyzes said data fields for said selected station in said database for at least one of lengthy titles and lengthy copy.

5. The system of claim 1 wherein said data processing means further automatically analyzes said data fields for said selected station in said database for editorial errors.

6. The system of claim 1 wherein said data processing means further automatically analyzes said data fields for said selected station in said database for inappropriate language.

7. The system of claim 1 wherein said transmission means transmits said database to a plurality of cable systems.

8. The system of claim 1 wherein transmission means transmits said database to a plurality of television viewers.

9. The system of claim 1 wherein said data fields for said selected station in said database comprise schedule times and run times for a plurality of television programs and said data processing means determines if either of the following inequalities is substantially met:

$$T_{n+1} > T_n + RT_n$$

$$T_{n+1} < T_n + RT_n$$

where $T_n$ denotes the schedule time and $RT_n$ the run time for the nth listing in the database for said selected station, and $T_{n+1}$ denotes the schedule time for the n+1th listing in the database for said selected station.

10. The system of claim 1 further comprising a display device for listing the start time and end time of said gaps and/or overlaps.

11. A data verification system for automatically verifying the integrity of a database of program schedule information for an electronic television program guide comprising:

storage means for storing a database of television program schedule listings, said database comprising a plurality of data fields for a plurality of television stations;

means for selecting a station list file for comparison against said plurality of television stations in said database;

data processing means for automatically comparing said station list file against said data fields for said plurality of stations in said database to determine if each station in said file is included in said database; and editing means for editing said database.

12. The system of claim 11 wherein said data processing means further automatically analyzes said data fields for said stations in said station list file for at least one of missing titles, copy, and fields.

13. The system of claim 11 wherein said data processing means further automatically analyzes said data fields for said stations in said station list file for at least one of lengthy titles and lengthy copy.

14. The system of claim 11 wherein said data processing means further automatically analyzes said data fields for said selected station in said station list file for editorial errors.

15. The system of claim 11 wherein said data processing means further automatically analyzes said data fields for said stations in said station list file for inappropriate language.

16. The system of claim 11 further comprising a display device for listing each station in said file not included in said database.

17. In an electronic program guide system for television programs, a system for automatically verifying the integrity of the data contained in a database of television program schedule information comprising:

storage means for storing a database of television program schedule information, said database comprising a plurality of data fields for a plurality of television stations;

means for selecting a station from said plurality of stations for verification of one or more of said data fields for said selected station;

means for selecting a time range for said verification of said one or more data fields;

a data processor for automatically analyzing said data fields for said station to locate gaps in the schedule data for said television station included in said program schedule information, and a display device for displaying information identifying said gaps.

18. The system of claim 17 wherein said data processor automatically locates schedule overlaps in said data fields for said selected station in said database and said display device displays information identifying said schedule overlaps.

19. The system of claim 17 wherein said data processor automatically locates missing titles in said data fields for said selected station in said database and said display device displays information identifying the locations of said missing titles.

20. The system of claim 17 wherein said data processor automatically locates missing fields in said data fields for said selected station in said database and said display device displays information identifying the locations of said missing fields.

21. The system of claim 17 further comprising means for transmitting said database to a plurality of remote locations.

22. The system of claim 21 wherein said plurality of remote locations comprise cable systems.

23. In an electronic program guide system for television programs, a system for automatically verifying the integrity of the data contained in a database of television program schedule information comprising:

storage means for storing a database of television program schedule information, said database comprising a plurality of data fields for a plurality of television stations means for selecting a station list file for comparison with said plurality of television stations in said database;

a data processor for automatically comparing said station list file against said data fields for said plurality of stations in said database to determine if each station in said file is included in said database;

and a display device for displaying information identifying stations in said file not included in said database.

24. The system of claim 23 wherein said data processor automatically locates missing titles in said data fields for said plurality of stations and said display device displays information identifying the locations of said missing titles.

25. The system of claim 23 wherein said data processor automatically locates missing fields in said data fields for said plurality of stations and said display device displays information identifying the locations of said missing fields.

26. A process for automatically verifying the integrity of a database of program schedule information for an electronic television program guide comprising:

providing a database of television program listings data to a data processor, said database comprising data fields for program titles, program start times, and program run times for a plurality of television stations, selecting a station from said plurality of stations for verification of one or more of said data fields for said selected station;

selecting a time range for said verification of said one or more data fields;

automatically analyzing said data fields for said selected station in said database for at least one of schedule gaps and schedule overlaps, listing said schedule gaps and/or schedule overlaps, and editing said database to correct said gaps and/or overlaps.

27. The process of claim 26 wherein said data processor further analyzes said data fields for said selected station in said database for at least one of missing titles, copy, and fields.

28. The process of claim 26 wherein said data processor further automatically analyzes said data fields for said selected station in said database for at least one of lengthy titles and lengthy copy.

29. The process of claim 26 wherein said data processor further automatically analyzes said data fields for said selected station in said database for editorial errors.

30. The process of claim 26 wherein said data processor further automatically analyzes said data fields for said selected station in said database for inappropriate language.

31. The process of claim 26 further comprising transmitting said database to a plurality of cable systems.

32. The process of claim 26 further comprising transmitting said database to a plurality of television viewers.

33. The process of claim 26 wherein said data fields for said selected station in said database comprise schedule times and run times for a plurality of television programs and said data processor determines if either of the following inequalities is substantially met:

$$T_{n+1} > T_n + RT_n$$

$$T_{n+1} < T_n + RT_n$$

where $T_n$ denotes the schedule time and $RT_n$ the run time for the nth listing in the database for said selected station, and $T_{n+1}$ denotes the schedule time for the n+1th listing in the database for said selected station.

34. The process of claim 26 further comprising listing the start time and end of said schedule gaps and/or overlaps.

35. A process for delivering an electronic television program guide to a plurality of remote locations comprising:

receiving television program listings from a plurality of information providers, formatting said program listings, providing said formatted program listings to a database of program schedule information, automatically analyzing said formatted listings to locate missing stations, missing titles, schedule gaps, and schedule overlaps, storing information identifying said located missing stations, missing titles, schedule gaps, and schedule overlaps, editing said formatted program listings in response to said stored information, extracting a portion of said formatted and edited program listings from said database, and transmitting said extracted portion to a remote location.

36. A process for automatically verifying the integrity of the data for an electronic television program guide comprising:

storing a database of television program schedule listings, said database comprising a plurality of data fields for a plurality of television stations, selecting a station list file, automatically comparing said station list file against said plurality of data fields to determine if each said station in said file is included in said database, editing said database to correct for any stations in said file not included in said database, and transmitting said edited database to a plurality of remote locations.

37. The process of claim 36 further comprising automatically analyzing said plurality of said fields for said stations in said station list file for at least one of missing titles, copy, and fields.

38. The process of claim 36 further comprising automatically analyzing said plurality of said fields for said stations in said station list file for at least one of lengthy titles and lengthy copy.

39. The process of claim 36 further comprising automatically analyzing said plurality of said fields for said stations in said station list file for editorial errors.

40. The process of claim 36 further comprising automatically analyzing said plurality of said fields for said stations in said station list file for inappropriate language.

41. The process of claim 36 further comprising listing the missing stations.

42. A method for automatically verifying the integrity of the data contained in a database of television program schedule information for an electronic television program guide comprising:

storing a database of television program schedule information, said database comprising a plurality of data fields for a plurality of television stations, selecting a station from said plurality of stations for verification of one or more of said data fields for said station, selecting a time range for said verification, automatically analyzing said data fields for said selected station to locate gaps in the schedule data for said television station included in said program schedule information, and displaying information identifying said gaps.

43. The method of claim 42 further comprising automatically locating schedule overlaps in said data fields for said selected station in said database and displaying information identifying said schedule overlaps.

44. The method of claim 42 further comprising automatically locating missing titles in said data fields for said selected station in said database and displaying information identifying the locations of said missing titles.

45. The method of claim 42 further comprising automatically locating missing fields in said data fields for said selected station in said database and displaying information identifying the locations of said missing fields.

46. The method of claim 42 further comprising editing said database and transmitting it to a plurality of remote locations.

47. The method of claim 46 wherein said plurality of remote locations comprise cable systems.

48. In an electronic program guide system for television programs, a method for automatically verifying the integrity of the data contained in a database of television program schedule information comprising:

storing a database of television program schedule information, said database comprising a plurality of data fields for a plurality of television stations, selecting a station list file, automatically comparing said station list file against said plurality of data fields to determine if each said station in said file is included in said database, and displaying information identifying the stations in said station list file not included in said database.

49. The method of claim 48 further comprising locating missing titles in said plurality of fields for said stations in said station list file and displaying information identifying the locations of said missing titles.

50. The method of claim 48 further comprising locating missing fields in said plurality of fields for said stations in said station list file and displaying information identifying the locations of said missing fields.

* * * * *